Feb. 12, 1946.  A. R. GOLRICK  2,394,693
METHOD OF AND APPARATUS FOR TRANSFERRING LOADS
FROM LOADED PALLETS TO INDUSTRIAL TRUCKS
Filed Oct. 27, 1943  3 Sheets-Sheet 1

INVENTOR.
ALBERT R. GOLRICK.
BY Fay, Golrick, Chilton & Isley
attorneys.

Feb. 12, 1946. A. R. GOLRICK 2,394,693
METHOD OF AND APPARATUS FOR TRANSFERRING LOADS
FROM LOADED PALLETS TO INDUSTRIAL TRUCKS
Filed Oct. 27, 1943 3 Sheets-Sheet 2
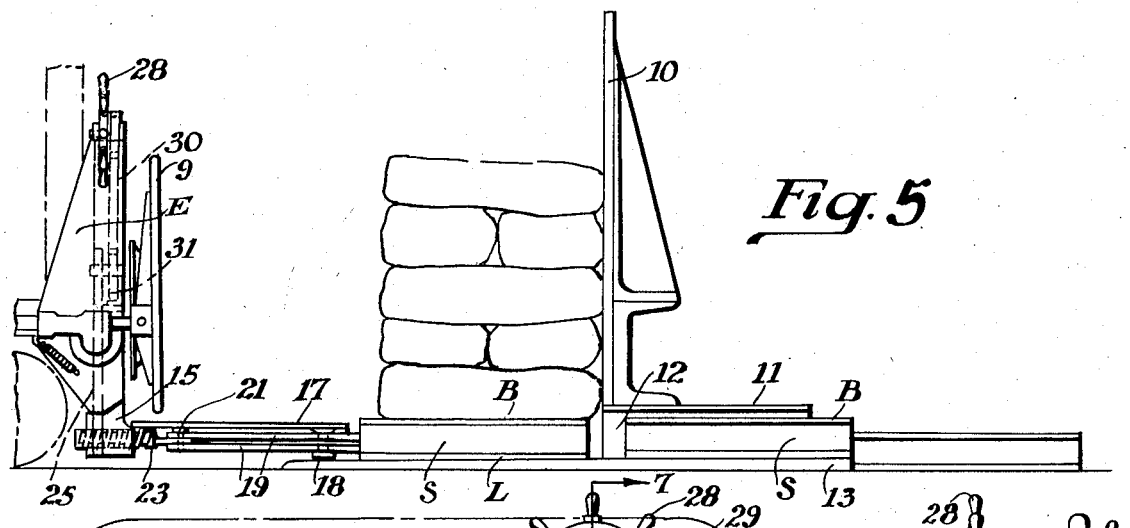
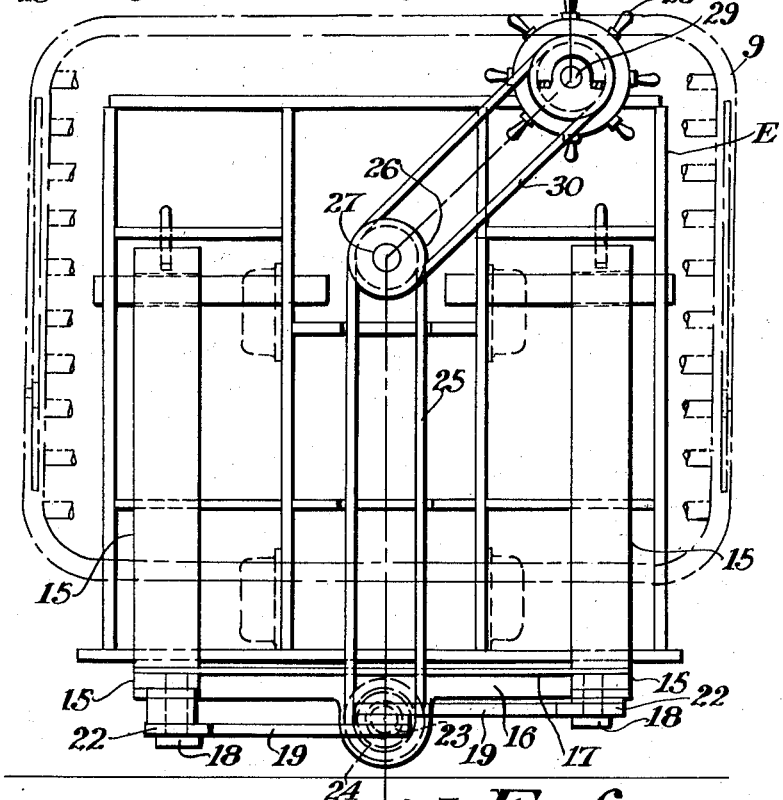
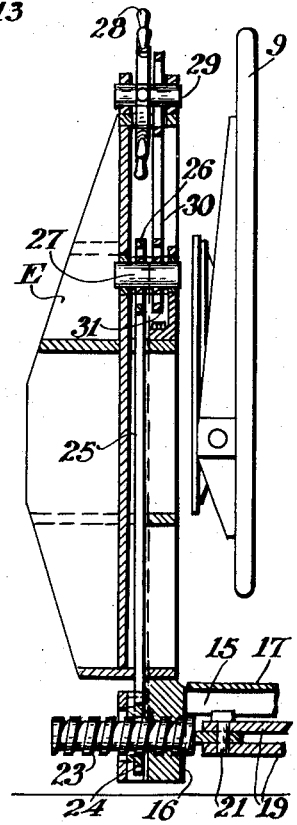
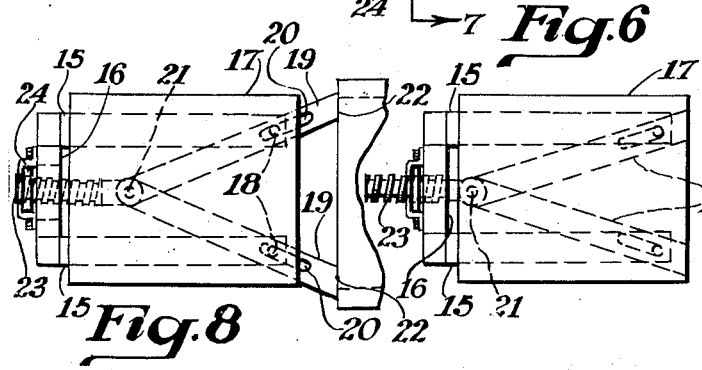
INVENTOR.
ALBERT R. GOLRICK.
BY Fay, Golrick, Chilton & Isler,
attorneys.

Feb. 12, 1946.  A. R. GOLRICK  2,394,693
METHOD OF AND APPARATUS FOR TRANSFERRING LOADS
FROM LOADED PALLETS TO INDUSTRIAL TRUCKS
Filed Oct. 27, 1943  3 Sheets-Sheet 3
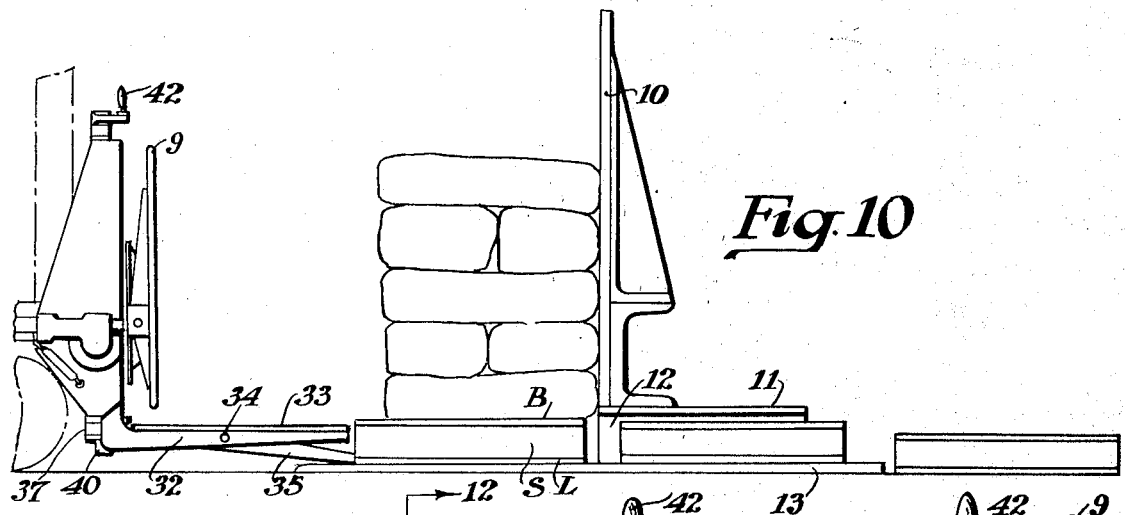
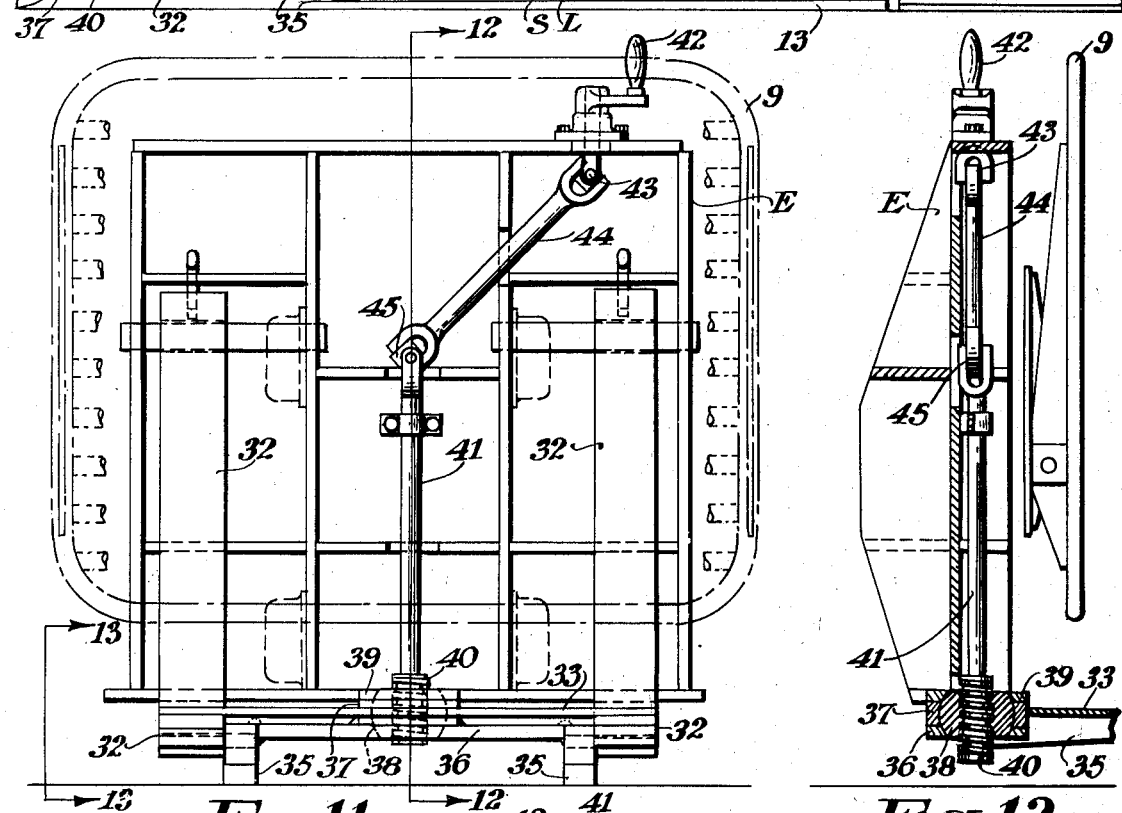
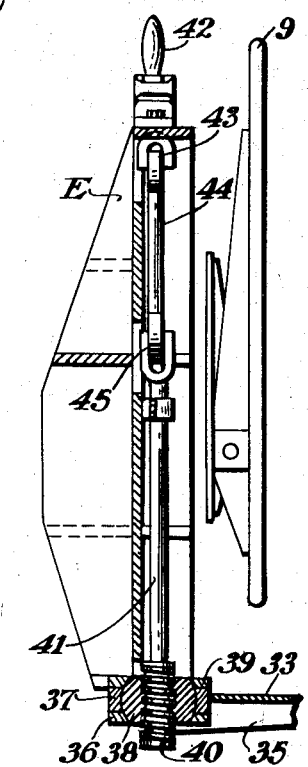
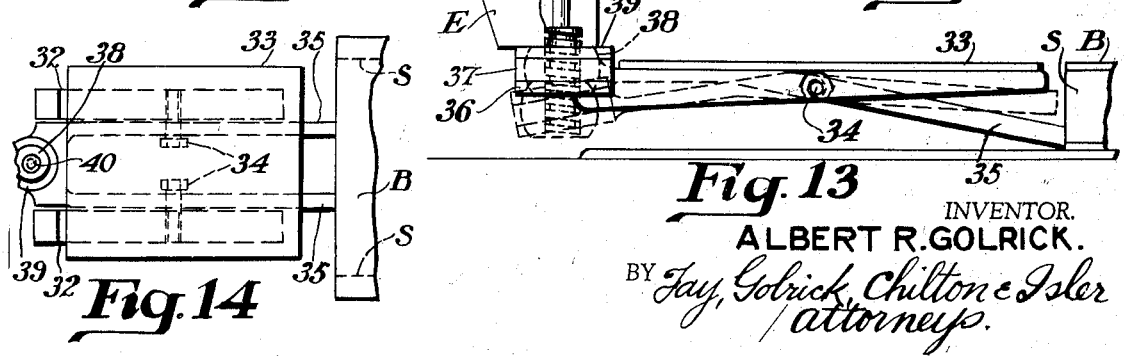
INVENTOR.
ALBERT R. GOLRICK.
BY Jay, Golrick, Chilton & Isler
attorneys.

Patented Feb. 12, 1946

2,394,693

UNITED STATES PATENT OFFICE 2,394,693

METHOD OF AND APPARATUS FOR TRANSFERRING LOADS FROM LOADED PALLETS TO INDUSTRIAL TRUCKS

Albert R. Golrick, Cleveland Heights, Ohio

Application October 27, 1943, Serial No. 507,794

14 Claims. (Cl. 214—152)

This invention relates, as indicated, to methods of and apparatus for transferring loads from loaded pallets or skids to industrial trucks.

In the handling of loaded pallets or skids by means of industrial lift trucks and the like, it frequently becomes necessary, particularly in connection with loads such as piles or stacks of bags filled with bulk materials, i. e., flour, cement, etc., to transfer the loads from the pallets or skids to the elevator of the truck, in order to permit the load, minus the pallet, to be deposited on the floor of a freight car or upon a previously deposited load in the freight car.

Various methods and means have been proposed for accomplishing this, but in each case, mechanism or means for holding the pallet or skid on the forks of the elevator while stripping the load therefrom was incorporated in the truck and pallets of special construction were designed for use in connection with such holding mechanism. These expedients were not always satisfactory, since the incorporation of such retaining means in the truck required space therefor where space was at a premium, and the mechanism was so located as to make access thereto for repair or replacement somewhat difficult. Moreover, the pallets, since they were especially designed for use in connection with such mechanism were, in some instances, limited in their field of usefulness.

The present invention has as its primary object the provision of methods and means for facilitating the transfer of loads of the character described from pallets to industrial trucks, and which do not require the use of mechanism for retaining the pallet on the forks of the truck, or pallets of special construction.

Another object of the invention is the provision of means for transferring a load of the character described from a pallet to the load-supporting portion of an industrial truck while preventing the pallet itself from being moved toward such portion of the truck.

A further object of the invention is the provision of means for simultaneously moving a pallet from under a load and transferring the load to the load-supporting portion of the truck.

A still further object of the invention is the provision in an industrial truck of the character described of means for preventing movement of a pallet towards the truck during the act of transferring the load from such pallet to the truck.

Other objects and advantages of the invention will be apparent during the course of the following description.

In the accompanying drawings, forming a part of this specification, and in which like numerals are employed to designate like parts throughout the same:

Fig. 5 is a view, similar to Figs. 1, 2 and 3, but showing a modified method and means for accomplishing the objects of the invention;

Fig. 6 is a front elevation of the industrial truck shown in Fig. 5;

Fig. 7 is a cross-sectional view, taken on the line 7—7 of Fig. 6;

Fig. 8 is a plan view of the load supporting portion of the truck, with the pallet-pushing members in extended or operative position;

Fig. 9 is a view similar to Fig. 8, but with the pallet-pushing members in retracted or inoperative position;

Fig. 10 is a view similar to Fig. 5, but showing a modified form of pallet-pushing means;

Fig. 11 is a front elevation of the industrial truck shown in Fig. 10;

Fig. 12 is a cross-sectional view, taken on the line 12—12 of Fig. 11;

Fig. 13 is a side elevational view, as indicated by the line 13—13 of Fig. 11; and Fig. 14 is a top plan view of the load-supporting portion of the truck, with the pallet-pushing members in lowered or operative position.

Figure 1:
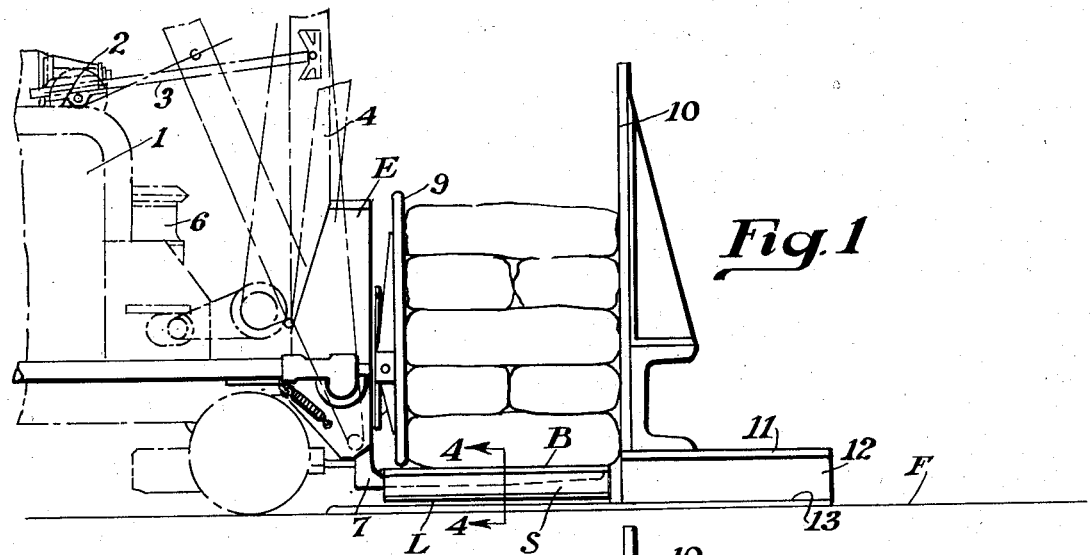
Fig. 1 is a view, illustrating more or less diagrammatically, the first step in one method and means for accomplishing the objects of the invention.

Referring more particularly to Figs. 1, 2, 3 and 4, it will be seen that an industrial truck, such as is best adapted for use in conjunction with the novel features of the present invention, generally comprises a battery 1 which is used to furnish power for a motor 2, which, through racks 3, functions to tilt a frame 4 to various positions, as indicated in Fig. 1. The frame comprises spaced channels having filler strips which serve as tracks or guides for the wheels of a vertically reciprocable elevator, generally designated E.

The elevator is propelled up or down along the frame 4 by means of a cable or chain 5, the ends of which are attached in any suitable manner to the elevator E, such chains or cables being driven by a motor 6, which derives its motive power from the battery 1.

The elevator E is provided with a pair of laterally-spaced forks 7 which, in this instance, have a plate 8 secured to the upper surfaces thereof, the width of this plate being slightly less than the width of the ordinary load-supporting skid or pallet which trucks of this character are designed to transport.

Such skids or pallets generally consist of an upper board B, a lower board L, and sides S, all of these parts usually formed of wood or like material. For the purposes of the present invention, the upper board B will be covered with a smooth sheet of metal or other material upon which a load may be easily slid.

The truck further includes a pusher or screen 9, which is mounted on the elevator E and is reciprocable relatively to such elevator, being substantially coextensive in width with the elevator. The construction of this pusher and the mechanism for reciprocating the same relatively to the elevator are fully described in the copending application of Henry F. Wilms, Serial No. 499,942, filed August 25, 1943, now Patent No. 2,371,661 granted March 20, 1945, and need not therefore be here described.

The truck is designed primarily for the lifting and transporting of loaded pallets, as shown in Fig. 1. Should the operator, after he has transported the load to the desired position, wish to leave the skid with the load, he will merely deposit the skid on the floor or on a previously deposited load, and back the truck away, the friction of the skid relatively to the floor or to the top of the previously deposited load serving to permit this without necessitating the use of the pusher 9, which remains in its retracted or inoperative position.

Should the operator, however, wish to transport the load into a freight car, it is desirable that the load be deposited without the pallet. For the purpose of facilitating the transfer of a load such as a pile of bags (Fig. 1), under such conditions, means have been provided for first transferring the load from the skid or pallet to the plate 8 of the elevator. Such means comprises a stationary abutment 10 which is of somewhat greater width than the pusher 9, and is mounted on a hollow frame or enclosure consisting of a top 11, sides 12 and a base or floor 13, the latter extending to a point considerably in advance of the abutment 10. The enclosure is anchored to the floor F (which may be the floor of the warehouse), in any suitable manner.

The method of use of the means shown in Figs. 1 to 4 inclusive will now be described.

With the pusher 9 in its retracted position, as shown in Fig. 1, the operator will pick up the skid or pallet bearing the load, and move the truck so as to bring it into engagement with the abutment 10, as in Fig. 1. Thereafter, the truck is backed away to the position shown in Fig. 2, thereby causing the pallet with its load, to remain in the position shown in such figure.

Figure 2:
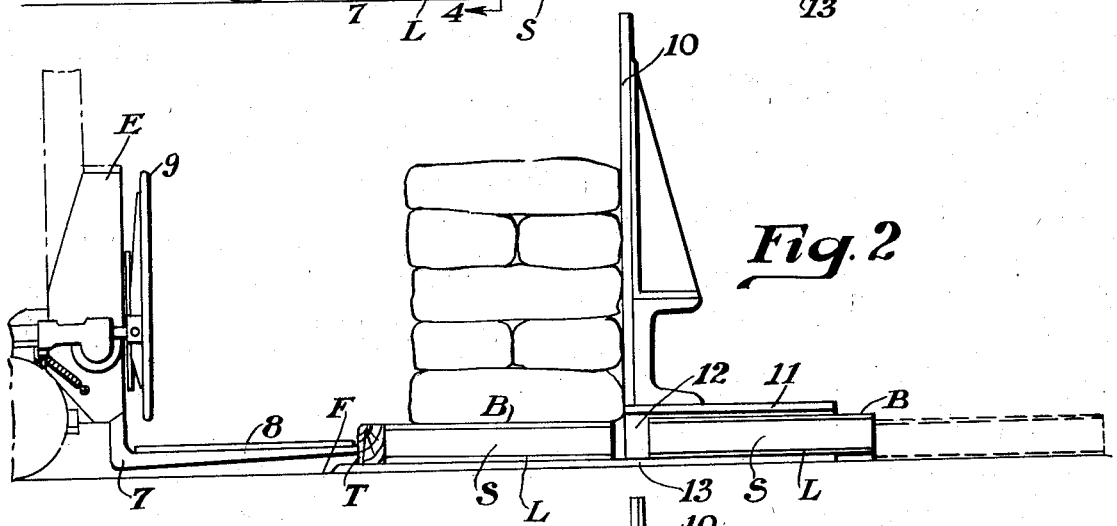
Fig. 2 is a view, similar to Fig. 1, but showing the second step in such method.
Figure 3:
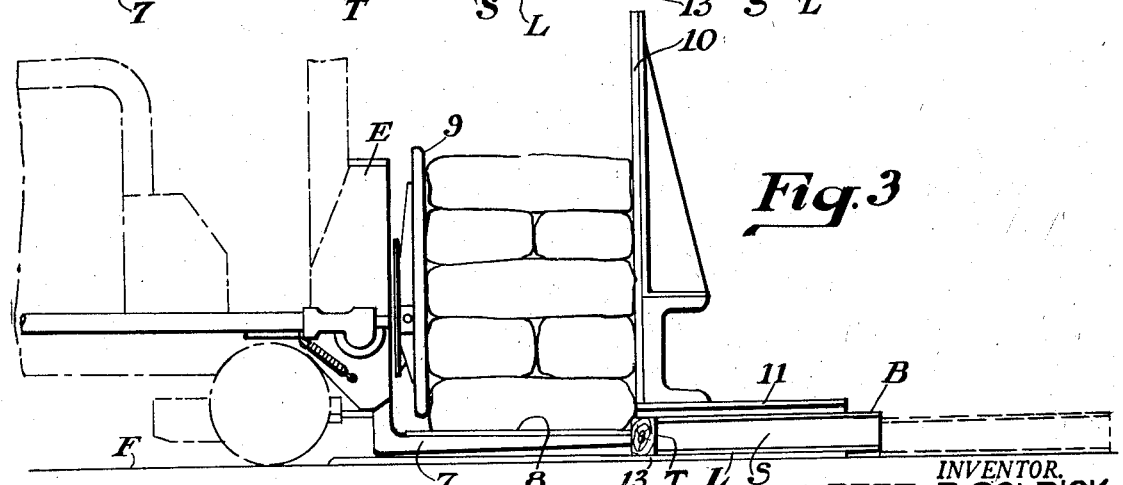
Fig. 3 is a view, similar to Figs. 1 and 2, but showing the last step in such method.
Figure 4:
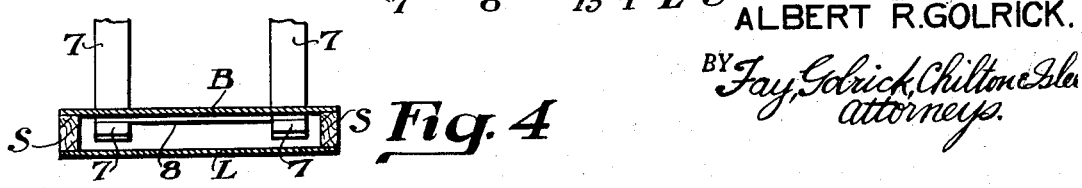
Fig. 4 is a cross-sectional view, taken on the line 4—4 of Fig. 1.

A two-by-four, designated T, is then placed against the front edge of the pallet, as in Fig. 2, and the truck then moved to the position shown in Fig. 3. Incidental to this movement, the forks 7 of the truck engage the two-by-four T and push such two-by-four to the position shown in Fig. 3, thereby causing the pallet to be moved into the enclosure formed by the elements 11, 12 and 13. Since the load is prevented by the abutment 10 from moving with the skid, the result of the aforesaid movement is to strip the load from the skid and transfer it onto the plate 8, as is apparent from Fig. 3.

The operator can then move the load into a freight car, and, by means of the pusher 9, strip the load from the plate 8, and deposit the load on the floor of the car or on a previously deposited load.

In that form of the invention shown in Figs. 5 to 9 inclusive, the truck elevator E has mounted thereon laterally spaced forks 15, which are connected at their lower ends by a cross-bar 16, the horizontal portions of the forks having secured to their upper surfaces a plate 17, which is similar to the plate 8 in the previously described form of the invention, the plate 17 being of such width as to be insertable into the space between the sides S of a pallet.

Secured to each of the forks 15, as by means of a rivet 18, is a pallet-pushing member or bar 19, the rivets extending through elongated openings or slots 20 in the bars 19, so as to permit both pivotal and longitudinal movement of the bars 19 relatively to the forks. The bars 19 extend angularly to each other and are pivotally connected to each other at their rear ends by means of a pivot pin 21, the front ends 22 of the bars being cut on the bias so as to lie substantially parallel with the front edge of the plate 17.

Secured to the pin 21 is a screw 23 which is in threaded engagement with the cross-bar 16, and is engaged by a nut 24 (Fig. 7). The nut 24 is provided at its periphery with sprocket teeth, enabling the nut to be rotated by an endless sprocket chain 25, which, in turn, is driven by a sprocket 26. The sprocket 26 is mounted on a stub shaft 27, which is journalled in the frame of the elevator E, and is driven by a handwheel 28 through the intermediary of a stub shaft 29, an endless sprocket chain 30 and a sprocket 31.

The operation of the aforesaid form of the invention may be described as follows:

The handwheel 28 is first rotated so as to retract the bars 19 to the position shown in Fig. 9, after which the truck is manipulated to pick up a loaded pallet in the usual way, that is, by first bringing the elements 15, 17 and 19 into the space between the sides S of the loaded pallet, and then operating the truck so as to transport the loaded pallet. At such time, the pusher 9 is in its retracted position.

The truck is then manipulated so as to bring the load into engagement with the abutment 10, as in Fig. 5. Thereafter, the truck is backed away to the position shown in Fig. 5, thereby causing the pallet with its load to remain in the position shown in such figure.

The handwheel 28 is then rotated so as to bring the bars 19 to the position shown in Fig. 8, after which the truck is moved to a position corresponding to that shown in Fig. 3 of the drawings, the pusher 9 remaining stationary during such movement. Incidental to this movement, the front ends 22 of the bars 19 engage the rear ends of the sides S of the pallet, as shown in Figs. 5 and 8, thereby causing the pallet to be moved into the enclosure formed by the elements 11, 12 and 13. Since the load is prevented by the abutment 10 from moving with the pallet, the result of the aforesaid movement is to strip the load from the skid and transfer it onto the plate 17.

The operator can then retract the bars 19 to the position shown in Fig. 9, and move the load into a freight car, and, by means of the pusher 9, strip the load from the plate 8, and deposit the load on the floor of the car or on a previously deposited load.

In that form of the invention shown in Figs. 10 to 14 inclusive, the truck elevator E has mounted thereon laterally-spaced forks 32, to the upper surfaces of the horizontal portions of which is secured a plate 33, similar in all respects to the plate 17.

Pivotally secured to the inboard faces of the horizontal portions of the forks 32, as by means of pivot pins 34, are pallet pushing members or bars 35, which are movable in a vertical plane, as indicated in Fig. 13. The bars 35 are connected together at their rear ends by means of a cross-bar 36, which, at its mid-portion, supports a socket 37, in which is mounted a ball 38, the ball being retained in the socket by means of a cover member 39.

Secured in threaded engagement with the ball 38 is a screw 40 having a reduced vertical extension 41, which is rotated by a handle 42 through the intermediary of a universal joint 43, a connecting link 44 and a second universal joint 45.

The operation of this aforesaid form of the invention may be described as follows:

The handle 42 is first rotated so as to elevate the front portions of the bars 35 to the position shown in dotted lines in Fig. 13, after which the truck is manipulated to pick up a loaded pallet in the usual way, that is, by first bringing the elements 32, 33 and 35 into the space between the sides S of the loaded pallet, and then operating the truck so as to transport the loaded pallet. At such time, the pusher 9 is in its retracted position.

The truck is then manipulated so as to bring the load into engagement with the abutment 10, as in Fig. 10. Thereafter, the truck is backed away to the position shown in Fig. 10, thereby causing the pallet with its load to remain in the position shown in such figure.

The handle 42 is then rotated so as to cause the bars 35 to move to the solid line position shown in Figs. 10, 11, 12, 13 and 14, after which the truck is moved to a position corresponding to that shown in Fig. 3 of the drawings, the pusher 9 remaining stationary during such movement. Incidental to this movement, the front ends of the bars 35 engage the rear edge of the bottom L of the pallet, as shown in Figs. 10, 13 and 14, thereby causing the pallet to be moved into the enclosure formed by the elements 11, 12 and 13. Since the load is prevented by the abutment 10 from moving with the pallet, the result of the aforesaid movement is to strip the load from the skid and transfer it onto the plate 33.

The operator can then elevate the bars 35 to the position shown in dotted lines in Fig. 13, and move the load into a freight car, and, by means of the pusher 9, strip the load from the plate 33, and deposit the load on the floor of the car or on a previously deposited load.

It will be apparent from the foregoing that I have provided a method of transferring loads from loaded pallets or skids to industrial trucks, which does not require the use of pallets or skids of special or complicated construction, that I have provided simple means either independent of the truck or incorporated in the elevator structure of the truck for pushing a pallet incidental to the transfer of the load to the truck, and that where such means is incorporated in the truck, it is easily manipulated and readily accessible for repair or replacement.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In combination, a stationary abutment having a skid-receiving opening therein, a base plate forming the bottom margin of the opening and extending forwardly of the abutment, an industrial truck adapted for transporting loaded skids to said abutment and to the depositing of loaded skids on the base plate, said truck having a load receiving platform comprising the load and skid supporting portion of the truck, and means carried by the load and skid supporting portion of the truck for pushing a skid along the base plate and from under its load and into said opening while the load is in engagement with said abutment, to thereby cause the load to be transferred to the load-supporting portion of the truck.

2. In an industrial truck of the character described, an elevator having a load receiving and transporting platform pallet-pushing means carried by said elevator and disposed below the platform, and means for moving said first-named means to operative or inoperative positions.

3. In an industrial truck of the character described, an elevator having a load receiving and transporting platform, pallet-pushing members mounted on said elevator beneath the platform, and screw-actuated means mounted on said elevator and operative to move said members to operative or inoperative positions.

4. In an industrial truck of the character described, an elevator, forks mounted on said elevator, and pallet-pushing bars pivotally mounted on said forks and movable to operative or inoperative positions.

5. In an industrial truck of the character described, an elevator, forks mounted on said elevator, pallet-pushing bars pivotally mounted on said forks, and means accessible to the truck operator for moving said bars to operative or inoperative position.

6. In an industrial truck of the character described, an elevator, forks mounted on said elevator, pallet-pushing bars pivotally mounted on said forks for movement in a horizontal plane, and means for moving said bars to operative or inoperative position.

7. In an industrial truck of the character described, an elevator, forks mounted on said elevator, and pallet-pushing bars pivotally mounted on said forks and movable to operative or inoperative positions, said bars extending to points in advance of the forward ends of said forks.

8. In an industrial truck of the character described, an elevator, forks mounted on said elevator, and pallet pushing bars carried by the elevator and positioned to underlie the forks and movable to operative or inoperative position, said bars extending to points in advance of the forward ends of said forks.

9. The method of loading merchandise stacked on skids into railroad cars by the use of a skid transporting industrial truck which includes the step of eliminating the skid from beneath the load by maneuvering the truck to bring the load into juxtaposition with a substantially vertical abutment having a skid receiving opening therein and depositing the skid with the load thereon in such juxtaposed position by depositing the skid and load so that the skid is adjacent said opening, withdrawing the truck from the skid and then causing the load to be transferred to the truck by using movement of the truck to force the skid from beneath the abutted load while maintaining the load substantially vertically stabilized.

10. The method of loading skid supported merchandise into railroad cars by the use of self-unloading industrial trucks, which includes the step of eliminating the skid from beneath the load before the load is transported into the railroad car by juxtaposing the skid and load thereon to an abutment spaced above the supporting surface of the truck to provide a skid passageway, depositing the loaded skid below the abutment and adjacent to the skid passageway, withdrawing the truck from beneath the thus deposited skid, then reapproaching the abutment and the load and the skid with the truck to thereby use the truck to move the skid to a position beneath the abutment and thus strip the skid from under the load while the load is stabilized by the abutment whereupon the transfer of the stacked load from the skid to the truck is effected.

11. In combination, a stationary abutment having a skid receiving opening at the bottom thereof, an industrial truck adapted for transporting loaded skids to said abutment and said abutment being positioned substantially transversely of a load-receiving end of the truck, said truck having a load receiving elevator comprising the load and skid supporting end of the truck and including a platform, the platform having a width slightly less than the width of the skid, and means associated with the elevator for pushing the skid from under the load by an advancing movement of the truck to shift the skid into the abutment opening while the load is in engagement with the abutment to thereby cause the load to be deposited on the elevator platform and the load thereafter to be supported by the platform substantially throughout the bottom area of the load during subsequent transportation of the load.

12. The method of transferring a load from a loaded skid to the load-supporting portion of an industrial truck, which consists in moving the loaded skid into a position for engagement with an abutment having a skid passageway, depositing the loaded skid with the skid positioned adjacent the passageway, causing the truck to push the skid relatively to the load while the load is engaged by the abutment to thereby strip the skid from the load and cause the load to gravitate to said load-supporting portion of the truck.

13. The method of transferring a load from a loaded skid to the load-supporting portion of an industrial truck, which consists in moving the loaded skid into a position for engagement with an abutment having an opening therein, and then pushing the skid relatively to said load by moving the truck toward the load to thereby move the skid into the opening and from beneath the load and thus cause the load to gravitate to said load-supporting portion of the truck.

14. The method of transferring a load from a loaded skid to the load-supporting portion of an industrial truck, which consists in moving the loaded skid into adjacent relation with an abutment having a skid receiving opening therein, the loaded skid while carried by the load-supporting portion of the truck being deposited adjacent the skid receiving opening, withdrawing said load-supporting portion of the truck from the skid, and then, while the load is maintained against said abutment, pushing the skid relatively to the load by an advancing movement of the truck, while bringing the load-supporting portion of the truck under the load to thereby push the skid from the load and into the abutment opening thus causing the load to gravitate to said load-supporting portion of the truck.

ALBERT R. GOLRICK.